United States Patent [19]
Goto et al.

[11] Patent Number: 5,149,585
[45] Date of Patent: Sep. 22, 1992

[54] MAGNETIC RECORDING MEDIUM

[75] Inventors: Narito Goto; Katsuyuki Takeda; Kunitsuna Sasaki; Nobuyuki Sekiguchi, all of Hino, Japan

[73] Assignee: Konica Corporation, Tokyo, Japan

[21] Appl. No.: 726,571

[22] Filed: Jul. 8, 1991

[30] Foreign Application Priority Data

Jul. 13, 1990 [JP] Japan ................... 2-186461

[51] Int. Cl.⁵ ............................................. G11B 23/00
[52] U.S. Cl. ................................... 428/323; 428/336; 428/425.9; 428/694; 428/329; 428/900
[58] Field of Search ............ 428/323, 329, 336, 425.9, 428/694, 900

[56] References Cited

U.S. PATENT DOCUMENTS

| | | | |
|---|---|---|---|
| 4,643,941 | 2/1987 | Miyoshi et al. | 428/900 |
| 4,851,289 | 7/1989 | Ogawa et al. | 428/329 |
| 4,865,924 | 9/1989 | Saito et al. | 428/694 |
| 4,911,997 | 3/1990 | Asai et al. | 428/694 |

Primary Examiner—Paul J. Thibodeau
Assistant Examiner—Leszek Kiliman
Attorney, Agent, or Firm—Jordan B. Bierman

[57] ABSTRACT

A magnetic recording medium is disclosed, which is improved in electromagnetic conversion properties. The recording medium comprises a support, an uppermost magnetic mayer being provided on the support and one or more lower magnetic layers being provided between the support and the uppermost magnetic layer, in which the uppermost magnetic layer comprises a binder and a hexagonal magnetic powder and has a layer thickness of from 0.1 μm to 1.0 μm, and at least one of the lower magnetic layer comprises a binder having a anionic functional group and a magnetic powder, and has a coercive force of from 500 Oe to 1200 Oe, and the uppermost magnetic layer and the lower layer were formed on the support by wet-on-wet simultaneous multi-layer coating.

16 Claims, 2 Drawing Sheets

MAGNETIC RECORDING MEDIUM

FIELD OF THE INVENTION

The present invention relates to magnetic recording media such as magnetic tape, magnetic sheet, magnetic disc.

BACKGROUND OF THE INVENTION

In general, magnetic recording media such as magnetic tape are manufactured by coating and drying, on a support, a magnetic paint comprising a magnetic powder, binder resin, etc. In conventional magnetic recording media, the magnetic layer is composed of a single layer, and thereby a single kind of magnetic powder has to cover a wide range from high frequency region to low frequency region. In the recent tendency toward a high density recording, which requires magnetic powders having high recording properties in a high frequency region and causing less noises, noises, magnetic powders of high Hc and high BET values have come to be used.

However, since a single kind of magnetic powder or magnetic layer constitutes a magnetic recording medium, such a magnetic recording medium is compelled to use magnetic powders with high Hc and high BET values because of importance to enhance high frequency properties, leaving low frequency properties unimproved.

In the magnetic recording medium for video tape, there is proposed a medium having multiple magnetic layers, of which uppermost layer contains hexagonal ferromagnetic powder, for the purposes of increasing magnetic recording capacities and improving magnetic recording properties in both high and low frequency regions as disclosed in Japanese Patent O. P. I. Publication Nos. 251923/1988, 79930/1989, 128228/1989, 251424/1989, 251425/1989, 251426/1989, 251427/1989.

In these known techniques, hexagonal ferromagnetic powders are contained in an uppermost magnetic layer, but hexagonal ferromagnetic powders are insufficient in low frequency characteristics; particularly, their chroma output is poor, though having high frequency output. Further, imperfect dispersion of magnetic powders in a lower layer has been left unimproved in these techniques, and thereby a very thin uppermost layer, usually 1.0 μm or less, is adversely affected and loses surface smoothness, causing deterioration in electromagnetic conversion properties.

From the manufacturing point of view, magnetic layers proposed in the above techniques are formed by the wet-on-dry method which comprises coating of an upper layer after coating and drying a lower layer; therefore, coating of an upper layer becomes difficult for a thickness less than 0.5 μm, this eventually brings about a low chroma output. Further, since hexagonal magnetic powders are tabular fine particles, it becomes difficult to coat them with their faces parallel to the magnetic layer as the uppermost layer gets thinner. As a result, overall electromagnetic conversion properties including high-frequency properties namely properties in a short wave side, are lowered. In addition to the above, poor adhesion between an uppermost layer and a lower layer jeopardizes durability.

SUMMARY OF THE INVENTION

An object of the present invention is to provide a magnetic recording medium improved in electromagnetic conversion properties including chroma output, which has a magnetic layer consisting of plural layers.

That is, the present invention relates to a magnetic recording medium having on a non-magnetic support a magnetic layer composed of an uppermost layer and one or more lower layers, wherein said uppermost layer contains a hexagonal magnetic powder and has a thickness of 0.1 to 1.0 μm, at least one of the lower layers contains a binder having anionic functional groups and has a coercive force of 500 to 1,200 Oe, and the lower layer and uppermost layer are formed by wet and simultaneous multi-layer coating.

BRIEF DESCRIPTION OF THE DRAWINGS

The figures intend to illustrate the present invention.

DETAILED DESCRIPTION OF THE INVENTION

Figure 1:
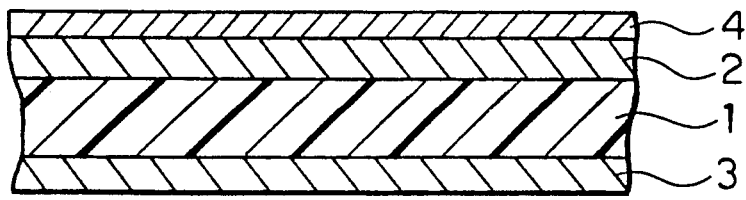
FIGS. 1 and 2 are sectional views of examples of the magnetic recording medium.

The important points of the invention are to form the magnetic layer with plural layers, to use a hexagonal magnetic powder in the uppermost layer, and to use a binder having negative functional groups at least in one of lower layers, most preferably in the lower layer adjacent is the uppermost layer.

Since the binder used in a lower layer has negative functional groups, a magnetic powder in a lower layer is dispersed adequately and thereby the surface smoothness of the lower layer, interface to the uppermost layer, is improved. Consequently, an uppermost layer can be coated with hexagonal magnetic particles well oriented parallel to the magnetic layer, therefore the coatability and surface smoothness of the uppermost layer are improved, even when it is thin. As a result; high electromagnetic conversion properties including RF output and Lumi S/N can be obtained.

Preferred binders used in a lower layer are those having molecular weights of about 10,000 to 200,000, more preferably 10,000 to 50,000. Examples thereof include vinyl chloride-vinyl acetate copolymers, vinyl chloride-vinylidene chloride copolymers, vinyl chloride-acrylonitrile copolymers, polyvinyl chloride, urethane resins, butadiene-acrylonitrile copolymers, polyamide resins, polyvinyl butylal, cellulose derivatives such as cellulose acetate butylate, cellulose diacetate, cellulose triacetate, cellulose propionate, nitrocellulose, styrene-butadiene copolymers, polyester resins, various synthetic rubbers, phenol resins, epoxy resins, urea resins, melamine resins, phenoxy resins, silicone resins, acrylic reactive resins, mixtures of high molecular weight polyester resin and isocyanate prepolymer, mixtures of polyesterpolyol and polyisocyanate, urea formaldehyde resins, mixtures of low molecular weight glycol/high molecular weight glycol/isocyanate, and mixtures thereof. Among these resins, vinyl chloride type resin and poly urethane resin are more preferable.

It is preferable that these binders be a resin having a hydrophilic anionic group such as -SO3M, -COOM, —PO(OM′)$_2$, wherein a hydrogen atom or alkali metal atom such as lithium, potassium or sodium; M′ is a hydrogen atom or alkali metal atom such as lithium, potassium or sodium, or a hydrocarbon residue) or a polar group containing a nitrogen atom. Among these polar groups, sulfonic group is preferable from the viewpoint of effects thereof. Owing to such intramolecular polar groups, these resins have a good compatibility with a magnetic powder, thereby the dispersibility of the magnetic powder is enhanced and aggregation thereof is prevented. This improves stability of a magnetic paint and eventually enhances durability of a medium. Said polar-group-having binder is preferably used in the lower layer adjacent to the uppermost layer. These resins having anionic functional groups can be also used as a binder of the uppermost layer. However, resins without anionic groups may also be used as a binder of the uppermost layer.

These binders, particularly vinyl chloride copolymers can be prepared by copolymerizing vinyl chloride monomers; copolymerizable monomers containing an alkali salt of sulfonic acid, carboxylic acid or phosphoric acid; and other monomers according to a specific requirement. Since this copolymerization is based on vinyl synthesis, polymerization is easy and characteristics of a copolymer can be adjusted most appropriately by selecting suitable copolymerization components.

The metal contained in the above sulfonate, carboxylate or phosphate is an alkali metal such as sodium, potassium or lithium. The content of the above modifying group (polar group) in a copolymer is preferably within a range of 0.01 to 1.0 m mol/g, especially 0.1 to 0.5 m mol/g.

Figure 3:
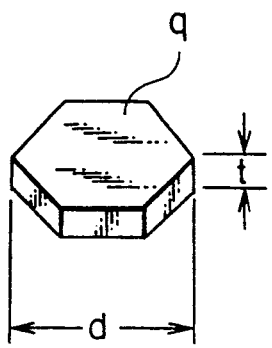
FIG. 3 is an enlarged oblique view of a hexagonal ferrite particle.

As a hexagonal magnetic powder used in an uppermost layer, hexagonal ferrite 9 shown in FIG. 3 is preferred. The tabular-shaped hexagonal ferrite preferably has a diameter d of 0.01 to 0.1 μm, ratio of diameter d to thickness t:d/t (tabular ratio) of 3 to 5, and its easy magnetizable axis is vertical to its tabular face. Accordingly, it can be readily oriented vertically by mechanical orientation to obtain a recording medium particularly suited for vertical magnetic recording. Moreover, hexagonal ferrite's tabular structure is thin enough to record short wave signals effectively, thereby it is suitable for an uppermost layer. Such a hexagonal ferrite magnetic material comprises barium ferrite, strontium ferrite, calcium ferrite, lead ferrite its iron element may be partly replaced by other elements such as Ti, Co, Zn, In, Mn, Ge, Nb, and several types of hexagonal ferrite magnetic materials may be used jointly. Among these ferrite, barium ferrite is particularly preferable. These ferrite magnetic materials are described in detail in I E E E Trans. on Mag., MAG-18, 16 (1982).

In the invention, the thickness of an uppermost layer should be 0.1 to 1.0 μm, and formation of such a thin layer can be properly done.

When the uppermost layer thickness is more than 1.0 μm, the chroma output is lowered. Hexagonal magnetic powders, though having good high frequency properties in nature, are less effective in low frequency range, particularly in chroma output, and in case the thickness of an uppermost layer is too large, effect produced in an uppermost layer is exerted on a lower layer and thus the chroma output is deteriorated. When the uppermost layer thickness is less than 0.1 μm, high frequency properties such as luminance signals are deteriorated owing to effect of a lower layer.

By specifying the thickness of an uppermost layer to 0.1 to 1.0 μm, there can be favorably obtained not only desired properties, particularly, high frequency properties such as an RF output and Lumi S/N, but also low frequency properties such as a chroma output. Said thickness of an uppermost layer is preferably 0.1 to 0.7 μm, especially 0.1 to 0.5 μm, most preferably 0.1 to 0.4 μm.

Such an uppermost layer thickness can be advantageously formed by the wet and simultaneous multi-layer coating of the invention.

In the invention, layers which constitute the magnetic recording layer are formed by extruding simultaneously a magnetic paint for a lower layer other than the uppermost layer and a magnetic paint for the uppermost layer in a wet state and coating them multi-layeredly in a wet-on-wet mode. Therefore, an uppermost layer can be easily coated on a lower layer, even a thin uppermost layer can be uniformly coated with a good adhesion, and plural layers can be multi-layeredly coated with a good reproducibility. Moreover, a hexagonal magnetic powder in an uppermost layer, though it is tabular, is readily oriented parallel to the layer face, because an uppermost layer is coated while a lower layer is wet. Accordingly, despite of a thin uppermost layer, coating can be made while orienting and dispersing a hexagonal magnetic powder adequately, thereby a magnetic orientation treatment after coating may be omitted. Or when the orientation is conducted, it is easily carried out and brings favorable results in the squareness ratio and the output. Low frequency properties such as chroma output, in a lower layer are best brought out since a thin uppermost layer is formed. In conventional media, such as the above Japanese Patent O. P. I. Publication No. 128228/1989, however, a web is once wound up after drying the coated lower layer. This roughens the surface of the lower layer and deteriorizes a successful coating of an uppermost layer, and the hexagonal magnetic powder cannot be properly oriented. The present invention is free from such disadvantages and capable of providing a multi-layered structure successfully.

In the invention, electromagnetic conversion properties, especially chroma outputs, can be enhanced by specifying the coercive force at least in one of lower magnetic layers to 500 to 1,200 Oe.

Recording and playback properties in a low frequency range, particularly chroma outputs are enhanced by specifying the coercive force at least in one of lower magnetic layers below 1,200 Oe. In this case, deterioration in chroma output caused by use of hexagonal magnetic powders in an uppermost layer can be adequately offset by a lower layer having coercive force of 500 to 1,200 Oe, and moreover, the chroma property itself can be improved. As a result, good low frequency properties can be obtained without impairing high frequency recording and playback properties in an uppermost layer. Specifying the coercive force above 500 Oe is also essential to enhance low frequency recording and playbacking properties as well as high frequency recording properties.

The coercive force is preferably in a range of 700 to 1,000 Oe, especially 800 to 900 Oe.

Preferable magnetic powders used in a lower layer are iron oxide magnetic powders, particularly Co-containing iron oxides such as $\gamma$-Fe$_2$O$_3$, Co-containing $\gamma$-Fe$_2$O$_3$, $\gamma$-Fe$_3$O$_4$, Co-containing $\gamma$-Fe$_3$O$_4$. In Co-containing iron oxides, the coercive force can be raised by increasing Co content, and it can be reduced by decreasing Co content; therefore, the coercive force of 500 to 1,200 Oe can be regulated by the Co content, namely, the amount of Co added in the course of magnetic powder or the $Fe^{2+}/Fe^{3+}$ ratio of iron oxide manufacturing.

Further, it is preferable that the magnetic powder used in a lower layer have an average major axis length of 0.10 to 0.40 μm, a crystal size of 200 to 500 Å, and a BET value of 25 to 60 $m^2/g$. More preferable magnetic powder for lower layer is ones having a average major axis length of 0.12 to 0.25 μm, a crystal size of 250 to 400 Å and a BET value of 40 to 55 $m^2/g$.

As magnetic powders used in an uppermost layer or lower layer, there may be jointly used conventional magnetic powders. Examples of such magnetic powders include the above iron oxide magnetic powders and metal magnetic powders containing Fe, Ni or Co as a main component, such as Fe, Ni, Co, Fe-Ni-Co alloy, Fe-Ni alloy, Fe-Al alloy, Fe-Al-Co alloy, Fe-Al-Ni alloy, Fe-Al-Co alloy, Fe-Mn-Zn alloy, Fe-Ni-Zn alloy, Fe-Al-Ni-Co alloy, Fe-Al-Ni-Cr alloy, Fe-Al-Co-Cr alloy, Fe-Co-Ni-Cr alloy, Fe-Co-Ni-P alloy, and Co-Ni alloy.

In the invention, it is preferable that magnetic-layer-constituting plural layers, an uppermost layer and lower layer, be adjacent to each other. The lower layer may consist of a single layer, or two layers or more. However, besides a case where a clear boundary is substantially present between layers, there is another case where magnetic powders of adjacent two layers are mixed in a boundary region having a certain thickness. In the latter case, the upper layer or lower layer excluding such a boundary region is each defined as the layer specified above.

Figure 2:
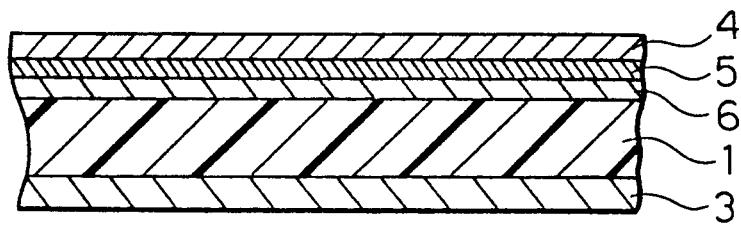

As illustrated in FIG. 1, the magnetic recording medium of the invention comprises, for example, 1st magnetic layer 2 and 2nd magnetic layer 4, laminated in this sequence on non-magnetic support 1 consisting of polyethylene terephthalate or the like. Backcoat layer 3 is provided on the support oppositely to the laminated layers, but is not necessarily provided. An overcoat layer may be provided on the 2nd magnetic layer. In FIG. 2, the lower layer 2 is further divided into layers 5 and 6.

In magnetic recording media illustrated in FIGS. 1 and 2, the thickness of 1st magnetic layer 2 or total layers 5 and 6 is preferably 1.5 to 4.0 μm; the thickness of 2nd magnetic layer 4 is 0.1 to 1.0 μm.

Besides the above magnetic powder and binder, each magnetic layer may contain lubricants such as silicone oil, graphite, molybdenum disulfide, tungsten disulfide, monobasic fatty acids having 12 to 20 carbon atoms (e.g., stearic acid), and fatty esters having 13 to 40 carbon atoms, abrasives such as alumina, antistatic agents such as carbon black, graphite and dispersing agents such as powder lecithin.

When backcoating layer 3 is provided, non-magnetic particles such as barium sulfate are contained in the binder and coated on the opposite side of the support.

As materials for support 1, there may be used plastics such as polyethylene terephthalate, polypropylene; metals such as aluminum, zinc; glass; and ceramics such as boron nitride, silicon carbide, porcelain, pottery. In order to reduce the binding of a head, it is preferable that the cross-directional Young's modulus of support 1 be 600 $kg/mm^2$.

Figure 4:
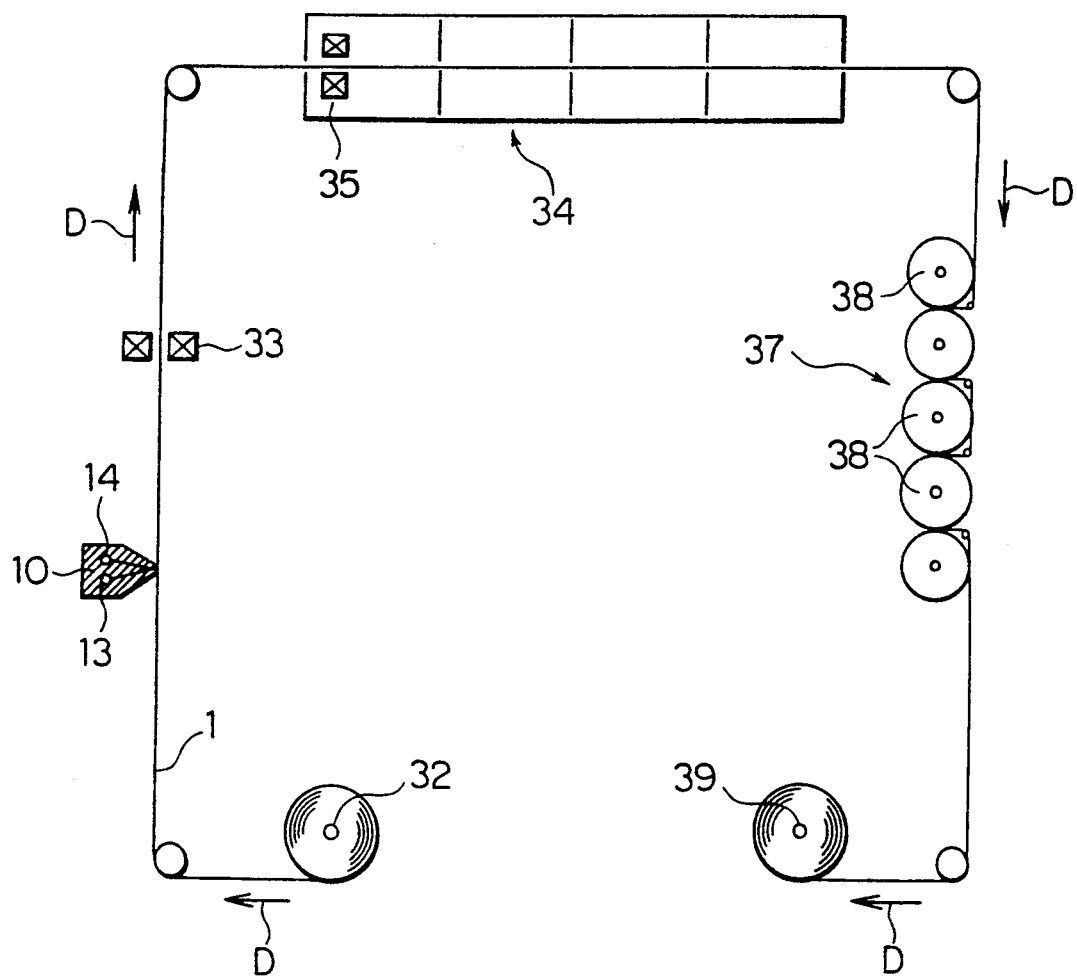
FIG. 4 is a schematic drawing of manufacturing equipment for magnetic recording media.
Figure 5:
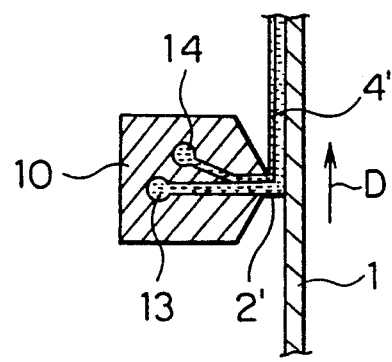
FIG. 5 is an enlarged view of the coater head portion of the manufacturing equipment.

FIGS. 4 and 5 illustrates an example of the method to manufacture a medium of the invention.

In this manufacturing method, when a medium shown in FIG. 1, for example, is manufactured, film support 1 fed by feed roll 32 is coated by extruding simultaneously paints 2' and 4' for magnetic layers 2 and 4 with a single extruding coater 10. Next, it is oriented with pre-orienting magnet 33 of 2,000 Gauss, for example and guided to dryer 34 equipped with post-orienting magnet 35 of 2,000 Gauss, for example, and then dried with hot air blown from nozzles arranged up and down. The orientation magnet 33 and the post-orientation magnet 35 may be omitted. Subsequently, support 1 carrying the dried coating layer is guided to super-calendering unit 37 composed of calender roll 38, after being calendered there, it is wound up by take-up roll 39. Each paint may be supplied to extruding coater 10 via an in-line mixer not illustrated in the figure. In the figure, arrow D indicates a direction in which the non-magnetic support travels. Extruding coater 10 is provided with reservoirs 13 and 14, and paints from the coater are lapped in a wet-on-wet manner. To manufacture a medium shown in FIG. 2, a reservoir and an extruding means are further added to extruding coater 10.

Extruding coater 10 is a one-head type, in which two magnetic paints 2' and 4' are guided in the head in crossing directions and lapped near the outlet and then extruded (for simultaneous and wet multi-layer coating), and can fully materialize the object of the invention.

However, the apparatus used in the above multi-layer coating is not necessarily to be an extruding coater. Other conventional coating apparatus may also be employed.

EXAMPLES

The examples of the invention are hereunder described.

In the following examples, "parts" means parts by weight.

EXAMPLE 1

The following compositions were each kneaded and then dispersed with a sand mill. Magnetic paint A for upper layer and magnetic paint B for lower layer were thus prepared.

Magnetic paint A for upper layer

| | |
|---|---|
| Hexagonal ferromagnetic powder, barium ferrite | 100 parts |
| Vinyl chloride type resin having potassium sulfonate group (MR-110, product of Nippon Zeon) | 10 parts |
| Polyurethane having sodium sulfonate group (UR-8300, product of Toyobo) | 5 parts |
| Alumina (average particle size: 0.2 μm) | 5 parts |
| Carbon black | 1 part |
| Myristic acid | 1 part |
| Stearic acid | 1 part |
| Butyl stearate | 1 part |
| Methyl ethyl ketone | 100 parts |
| Cyclohexane | 100 parts |
| Toluene | 100 parts |

Magnetic paint B for lower layer

This paint was prepared in the same manner as with the paint for upper layer, except that Co-containing magnetic iron oxide ($\gamma$-$Fe_2O_3$, Hc: 600 Oe, average major axis length: 0.35 μm, crystal size: 450 Å) was employed in place of the hexagonal magnetic powder used in the paint for upper layer.

Next, to each of magnetic paint B for lower layer and magnetic paint A for upper layer 5 parts of weight of polyisocyanate (Coronate L, Nihon Polyurethane Co.) was added as a hardened And the paints were sequentially coated in the wet-on-wet manner, on a 14.5 μm-thick polyethylene terephthalate base film, using an apparatus shown in FIG. 4 to give an upper layer thickness of 0.5 μm and a lower layer thickness of 2.5 μm. Then, the coated film was oriented, dried and calendered.

After that, a backcoat paint of the following composition was coated to a dry thickness of 0.8 μm on the side opposite to the magnetic layer.

| | |
|---|---|
| Carbon black (Raven 1035) | 40 parts |
| Barium sulfate (average particle size: 300 μm) | 10 parts |
| Nitrocellulose | 25 parts |
| Polyurethane (N-2301 product of Nippon Polyurethane Ind.) | 25 parts |
| Polyisocyanate (Colonate L) | 10 parts |
| Cyclohexane | 400 parts |
| Metyl ethyl ketone | 250 parts |
| Toluene | 250 parts |

The broad magnetic film obtained as above was wound up. The film was then cut into ½-in-wide tapes.

EXAMPLES 2 to 6

Samples of ½-in-wide tapes were prepared in the same manner as in Example 1, except that the thickness of the upper layer was varied as shown in Table 1(A).

EXAMPLES 7 to 11

Samples of ½-in-wide tapes were prepared in the same manner as in Example 1, except that the coercive force of the lower layer was varied as shown in Table 1 (A).

EXAMPLE 12 to 16

Samples of ½-in-wide tapes were prepared in the same manner as in Example 1, except that the dry thickness of the upper layer and that of the lower layer were varied as shown in Table 1(A).

EXAMPLES 17 and 18

Samples of ½-in-wide tapes were prepared in the same manner as in Example 1, except that the magnetic powder in the upper layer was changed to hexagonal strontium ferrite as shown in Table 1(A), Example 17 and the binder polyurethane in the lower layer was changed to —COONa having polyurethane (product of Sanyo Chemical), Example 18.

EXAMPLE 19

Samples of ½-in-wide tapes were prepared in the same manner as in Example 1, except that a Co-containing iron oxide used as the magnetic powder of the lower layer, which has the Hc of 600 Oe, average major axis length of 0.12 μm and crystal size of 380 Å.

EXAMPLE 20

Samples of ½-in-wide tapes were prepared in the same manner as in Example 1, except that a Co-containing iron oxide used as the magnetic powder of the lower layer, which has the Hc of 600 Oe, average major axis length of 0.16 μm and crystal size of 330 Å.

COMPARISONS 1 and 2

Samples of ½-in-wide tapes were prepared in the same manner as in Example 1, except that the coercive force of the lower layer was varied as shown in Table 1 (B).

COMPARISONS 3, 4, 5

Samples of ½-in-wide tapes were prepared in the same manner as in Example 1, except that, in the lower layer, the potassium-sulfonate-containing vinylchloride resin used was changed to a vinyl chloride-vinyl acetate copolymer (VAGH, product of Union Carbide Corp.), and sodium-sulfonate-containing polyurethane to polyurethane (Estane 5701, product of B. F. Goodrich).

COMPARISONS 6 and 7

Samples of ½-in-wide tapes were prepared in the same manner as in Example 1, except that the dry thickness of the upper layer and that of the lower layer were changed as shown in Table 1(B).

COMPARISONS 8 and 9

Samples of ½-in-wide tapes were prepared in the same manner as in Example 1, except that the thickness of the upper layer was varied as shown in Table 1(B).

COMPARISON 10

A sample of ½-in-wide tapes was prepared in the same manner as in Example 1, except that the barium ferrite used in the upper layer was changed to a acicular-shaped Co-containing $Fe_2O_3$ (Hc: 800 Oe).

COMPARISON 11

A sample of ½-in-wide tapes was prepared in the same manner as in Example 1, except that the coating method of the magnetic layer was changed from wet on wet mode to wet-on-dry mode in which the coated lower layer was dried and the upper layer was coated thereon.

The tape properties of the above samples were determined by the following manners:

Coatability

During coating, the coatability was visually checked.
G: good coatability
P: poor coatability
RF output, Lumi S/N, Chroma S/N, Chroma output
The tests were conducted with a color video noise meter Shibasoku 925 D/1 and a deck HR-S 7000 made by Japan Victor. The results were reported in values (dB) against a reference tape. Frequencies of respective signals were as follows:

| | |
|---|---|
| RF output | 6 MHz |
| Lumi S/N | 6 MHz |
| Chroma S/N | 629 KHz |
| Chroma output | 629 KHz |

TABLE 1 (A)

| Magnetic layer | Ex.-1 | Ex.-2 | Ex.-3 | Ex.-4 | Ex.-5 | Ex.-6 | Ex.-7 |
|---|---|---|---|---|---|---|---|
| Uppermost layer | | | | | | | |
| Dry thickness (μm) | 0.5 | 0.3 | 0.7 | 1.0 | 0.1 | 0.8 | 0.5 |
| Magnetic powder | Barium | Barium | Barium | Barium | Barium | Barium | Barium |

TABLE 1 (A)-continued

| | ferrite | ferrite | ferrite | ferrite | ferrite | ferrite | ferrite |
|---|---|---|---|---|---|---|---|
| Anionic functional group of PVC resin | —SO₃K | —SO₃K | —SO₃K | —SO₃K | —SO₃K | —SO₃K | —SO₃K |
| Anionic functional group of urethane resin | —SO₃Na | —SO₃Na | —SO₃Na | —SO₃Na | —SO₃Na | —SO₃Na | —SO₃Na |
| Dry thickness (μm) | 2.5 | 2.5 | 2.5 | 2.5 | 2.5 | 2.5 | 2.5 |
| Lower layer | | | | | | | |
| Anionic functional group of PVC resin | —SO₃K | —SO₃K | —SO₃K | —SO₃K | —SO₃K | —SO₃K | —SO₃K |
| Anionic functional group of urethane resin | —SO₃Na | —SO₃Na | —SO₃Na | —SO₃Na | —SO₃Na | —SO₃Na | —SO₃Na |
| Coercive force (Oe) | 650 | 650 | 650 | 650 | 650 | 650 | 900 |
| Magnetic powder | Co-containing iron oxide | Co-containing iron oxide | Co-containing iron oxide | Co-containing iron oxide | Co-containing iron oxide | Co-containing iron oxide | Co-containing iron oxide |
| RF output (dB) | 3.1 | 2.9 | 3.2 | 3.3 | 2.0 | 3.1 | 3.3 |
| Lumi S/N (dB) | 2.9 | 2.8 | 3.0 | 3.1 | 2.1 | 3.0 | 3.0 |
| Chroma output (dB) | 2.0 | 2.7 | 1.0 | 0.4 | 3.5 | 0.8 | 1.7 |
| Chroma S/N | 2.0 | 2.1 | 1.8 | 1.7 | 2.3 | 1.8 | 1.9 |
| Coatability | G | G | G | G | G | G | G |
| Coating method | Simultaneously extruding wet-on-wet | Simultaneously extruding wet-on-wet | Simultaneously extruding wet-on-wet | Simultaneously extruding wet-on-wet | Simultaneously extruding wet-on-wet | Simultaneously extruding wet-on-wet | Simultaneously extruding wet-on-wet |

| Magnetic layer | Ex.-8 | Ex.-9 | Ex.-10 | Ex.-11 | Ex.-12 | Ex.-13 | Ex.-14 |
|---|---|---|---|---|---|---|---|
| Uppermost layer | | | | | | | |
| Dry thickness (μm) | 0.5 | 0.5 | 0.5 | 0.5 | 0.3 | 0.7 | 1.0 |
| Magnetic powder | Barium ferrite | Barium ferrite | Barium ferrite | Barium ferrite | Barium ferrite | Barium ferrite | Barium ferrite |
| Anionic functional group of PVC resin | —SO₃K | —SO₃K | —SO₃K | —SO₃K | —SO₃K | —SO₃K | —SO₃K |
| Anionic functional group of urethane resin | —SO₃Na | —SO₃Na | —SO₃Na | —SO₃Na | —SO₃Na | —SO₃Na | —SO₃Na |
| Dry thickness (μm) | 2.5 | 2.5 | 2.5 | 2.5 | 2.7 | 2.3 | 2.0 |
| Lower layer | | | | | | | |
| Anionic functional group of PVC resin | —SO₃K | —SO₃K | —SO₃K | —SO₃K | —SO₃K | —SO₃K | —SO₃K |
| Anionic functional group of urethane resin | —SO₃Na | —SO₃Na | —SO₃Na | —SO₃Na | —SO₃Na | —SO₃Na | —SO₃Na |
| Coercive force (Oe) | 700 | 1150 | 1200 | 500 | 650 | 650 | 650 |
| Magnetic powder | Co-containing iron oxide | Co-containing iron oxide | Co-containing iron oxide | Co-containing iron oxide | Co-containing iron oxide | Co-containing iron oxide | Co-containing iron oxide |
| RF output (dB) | 3.1 | 3.2 | 3.2 | 2.8 | 2.8 | 3.1 | 3.1 |
| Lumi S/N (dB) | 2.9 | 3.0 | 3.1 | 2.7 | 2.5 | 3.0 | 3.1 |
| Chroma output (dB) | 1.9 | 1.4 | 1.0 | 2.4 | 3.1 | 1.3 | 0.9 |
| Chroma S/N | 2.0 | 1.7 | 1.6 | 2.2 | 2.3 | 2.1 | 2.0 |
| Coatability | G | G | G | G | G | G | G |
| Coating method | Simultaneously extruding wet-on-wet | Simultaneously extruding wet-on-wet | Simultaneously extruding wet-on-wet | Simultaneously extruding wet-on-wet | Simultaneously extruding wet-on-wet | Simultaneously extruding wet-on-wet | Simultaneously extruding wet-on-wet |

| Magnetic layer | Ex.-15 | Ex.-16 | Ex.-17 | Ex.-18 | Ex.-19 | Ex.-20 |
|---|---|---|---|---|---|---|
| Uppermost layer | | | | | | |
| Dry thickness (μm) | 0.2 | 0.1 | 0.5 | 0.5 | 0.5 | 0.5 |
| Magnetic powder | Barium ferrite | Barium ferrite | Barium ferrite | Barium ferrite | Barium ferrite | Barium ferrite |
| Anionic functional group | —SO₃K | —SO₃K | —SO₃K | —SO₃K | —SO₃K | —SO₃K |

TABLE 1 (A)-continued

|  |  |  |  |  |  |  |
|---|---|---|---|---|---|---|
| of PVC resin |  |  |  |  |  |  |
| Anionic functional group of urethane resin | —SO₃Na | —SO₃Na | —SO₃Na | —SO₃Na | —SO₃Na | —SO₃Na |
| Dry thickness (μm) | 2.8 | 2.9 | 2.5 | 2.5 | 2.5 | 2.5 |
| Lower layer |  |  |  |  |  |  |
| Anionic functional group of PVC resin | —SO₃K | —SO₃K | —SO₃K | —SO₃K | —SO₃K | —SO₃K |
| Anionic functional group of urethane resin | —SO₃Na | —SO₃Na | —SO₃Na | —COONa | —SO₃Na | —SO₃Na |
| Coercive force (Oe) | 650 | 650 | 650 | 650 | 650 | 650 |
| Magnetic powder | Co-containing iron oxide | Co-containing iron oxide | Co-containing iron oxide | Co-containing iron oxide | Co-containing iron oxide | Co-containing iron oxide |
| RF output (dB) | 2.3 | 1.8 | 2.8 | 3.0 | 3.3 | 3.7 |
| Lumi S/N (dB) | 2.0 | 1.7 | 2.7 | 2.8 | 3.1 | 3.5 |
| Chroma output (dB) | 3.7 | 4.0 | 1.8 | 1.9 | 2.0 | 2.0 |
| Chroma S/N | 2.4 | 2.3 | 1.8 | 1.9 | 2.3 | 2.6 |
| Coatability | G | G | G | G | G | G |
| Coating method | Simultaneously extruding wet-on-wet | Simultaneously extruding wet-on-wet | Simultaneously extruding wet-on-wet | Simultaneously extruding wet-on-wet | Simultaneously extruding wet-on-wet | Simultaneously extruding wet-on-wet |

Notes:
In the table, Ex. means Example

TABLE 1 (B)

| Magnetic layer | Comp.-1 | Comp.-2 | Comp.-3 | Comp.-4 | Comp.-5 | Comp.-6 |
|---|---|---|---|---|---|---|
| Uppermost layer |  |  |  |  |  |  |
| Dry thickness (μm) | 0.5 | 0.5 | 0.5 | 0.5 | 0.5 | 1.2 |
| Magnetic powder | Barium ferrite | Barium ferrite | Barium ferrite | Barium ferrite | Barium ferrite | Barium ferrite |
| Anionic functional group of PVC resin | —SO₃K | —SO₃K | —SO₃K | —SO₃K | —SO₃K | —SO₃K |
| Anionic functional group of | —SO₃Na | —SO₃Na | —SO₃Na | —SO₃Na | —SO₃Na | —SO₃Na |
| Dry thickness (μm) | 2.5 | 2.5 | 2.5 | 2.5 | 2.5 | 1.8 |
| Lower layer |  |  |  |  |  |  |
| Anionic functional group of PVC resin | —SO₃K | —SO₃K | None | None | None | —SO₃K |
| Anionic functional group of urethane resin | —SO₃Na | —SO₃Na | None | None | None | —SO₃Na |
| Coercive force (Oe) | 450 | 1250 | 642 | 450 | 1250 | 650 |
| Magnetic powder | Co-containing iron oxide | Co-containing iron oxide | Co-containing iron oxide | Co-containing iron oxide | Co-containing iron oxide | Co-containing iron oxide |
| RF output (dB) | 1.5 | 3.3 | 1.4 | 0.7 | 2.4 | 3.2 |
| Lumi S/N (dB) | 1.3 | 3.1 | 1.1 | 0.5 | 2.3 | 3.1 |
| Chroma output (dB) | 2.8 | 0.2 | 1.0 | 2.1 | −0.1 | −0.4 |
| Chroma S/N | 1.1 | 1.5 | 0.5 | 0.5 | 0.6 | 1.8 |
| Coatability | G | G | G | G | G | G |
| Coating method | Simultaneously extruding wet-on-wet | Simultaneously extruding wet-on-wet | Simultaneously extruding wet-on-wet | Simultaneously extruding wet-on-wet | Simultaneously extruding wet-on-wet | Simultaneously extruding wet-on-wet |

| Magnetic layer | Comp.-7 | Comp.-8 | Comp.-9 | Comp.-10 | Comp.-11 |
|---|---|---|---|---|---|
| Uppermost layer |  |  |  |  |  |
| Dry thickness (μm) | 1.2 | 0.05 | 0.05 | 0.5 | 0.5 |
| Magnetic powder | Barium | Barium | Barium | Acicular Co- | Barium |

TABLE 1 (B)-continued

|  |  |  |  |  |  |
|---|---|---|---|---|---|
|  | ferrite | ferrite | ferrite | containing iron oxide | ferrite |
| Anionic functional group of PVC resin | —SO$_3$K | —SO$_3$K | —SO$_3$K | —SO$_3$K | —SO$_3$K |
| Anionic functional group of | —SO$_3$Na | —SO$_3$Na | —SO$_3$Na | —SO$_3$Na | —SO$_3$Na |
| Dry thickness ($\mu$m) | 2.5 | 2.95 | 2.5 | 2.5 | 2.5 |
| Lower layer |  |  |  |  |  |
| Anionic functional group of PVC resin | —SO$_3$K | —SO$_3$K | None | —SO$_3$K | —SO$_3$K |
| Anionic functional group of urethane resin | —SO$_3$Na | —COONa | None | —SO$_3$Na | —SO$_3$Na |
| Coercive force (Oe) | 650 | 650 | 1250 | 650 | 650 |
| Magnetic powder | Co-containing iron oxide | Co-containing iron oxide | Co-containing iron oxide | Co-containing iron oxide | Co-containing iron oxide |
| RF output (dB) | 3.3 | 0.8 | −0.1 | 1.1 | — |
| Lumi S/N (dB) | 3.1 | 0.6 | −0.2 | 1.0 | — |
| Chroma output (dB) | −0.3 | 4.2 | 3.3 | 2.1 | — |
| Chroma S/N | 1.9 | 2.3 | 1.5 | 2.0 | — |
| Coatability | G | G | G | G | P |
| Coating method | Simultaneously extruding wet-on-wet | Simultaneously extruding wet-on-wet | Simultaneously extruding wet-on-wet | Simultaneously extruding wet-on-wet | Wet on dry |

Notes:
In the table. Comp. means Comparison

As apparent from the above results, adjusting the uppermost layer's dry thickness to 0.1 to 1.0 $\mu$m enhances the RF output and Lumu S/N. It is also apparent that the chroma output and chroma S/N are improved by incorporating a binder containing negative functional groups to the lower layer and specifying the coercive force of the lower layer to 500 to 1,200 Oe. Further, when an iron oxide magnetic powder is used in the uppermost layer, use of a binder containing anionic functional groups in the lower layer does exert much effect and high frequency properties are not adequate; but when hexagonal magnetic powders are used in the uppermost layer, the effect of the above binder contained in the lower layer comes to be obvious and high electromagnetic conversion properties are obtained. In addition to the above, the thickness of the uppermost layer can be minimized, and a high coatability is obtained, by simultaneous multi-layer coating of the uppermost layer and lower layer in a wet state.

Next, a property evaluation was conducted with a case where the magnetic layer is formed into a three-layered structure consisting of layers 4, 5, 6 as shown in FIG. 2. Compositions of upper layer 4 and lower layer 6 were the same as those of the above mentioned layers 4 and 2, but intermediate layer 5 is specified to have a dry thickness of 0.3 $\mu$m and coercive force of 850 Oe. From the evaluation results shown in Table 2, it is apparent that the constitution of the invention provides good properties, equally to the case of 2 layers.

TABLE 2

| Magnetic layer | Ex.-21 | Ex.-22 | Ex.-23 | Comp.-12 | Comp.-13 | Comp.-14 |
|---|---|---|---|---|---|---|
| Uppermost layer |  |  |  |  |  |  |
| Dry thickness ($\mu$m) | 0.5 | 0.5 | 0.5 | 0.05 | 1.2 | 0.5 |
| Magnetic powder | Barium ferrite | Barium ferrite | Barium ferrite | Barium ferrite | Barium ferrite | Barium ferrite |
| Anionic functional group of PVC resin | —SO$_3$K | —SO$_3$K | —SO$_3$K | —SO$_3$K | —SO$_3$K | —SO$_3$K |
| Anionic functional group of urethane resin | —SO$_3$Na | —SO$_3$Na | —SO$_3$Na | —SO$_3$Na | —SO$_3$Na | —SO$_3$Na |
| Middle layer |  |  |  |  |  |  |
| Dry thickness ($\mu$m) | 0.3 | 0.3 | 0.3 | 0.3 | 0.3 | 0.3 |
| Anionic functional group of PVC resin | —SO$_3$K | —SO$_3$K | —SO$_3$K | —SO$_3$K | —SO$_3$K | None |
| Anionic functional group of urethane resin | —SO$_3$Na | —SO$_3$Na | —SO$_3$Na | —SO$_3$Na | —SO$_3$Na | None |
| Coercive force (Oe) | 850 | 850 | 1250 | 850 | 850 | 650 |
| Magnetic powder | Co- | Co- | Co- | Co- | Co- | Co- |

TABLE 2-continued

| | | | | | | |
|---|---|---|---|---|---|---|
| | containing iron oxide | containing iron oxide | containing iron oxide | containing iron oxide | containing iron oxide | containing iron oxide |
| Dry thickness (μm) | 2.5 | 2.5 | 2.5 | 2.5 | 2.5 | 2.5 |
| Lower layer | | | | | | |
| Anionic functional group of PVC resin | —SO$_3$K | None | —SO$_3$K | —SO$_3$K | —SO$_3$K | None |
| Anionic functional group of urethane resin | —SO$_3$Na | None | —SO$_3$Na | —SO$_3$Na | —SO$_3$Na | None |
| Coercive force (Oe) | 650 | 650 | 650 | 650 | 650 | 650 |
| Magnetic powder | Co-containing iron oxide | Co-containing iron oxide | Co-containing iron oxide | Co-containing iron oxide | Co-containing iron oxide | Co-containing iron oxide |
| RF output (dB) | 3.4 | 3.3 | 3.4 | 0.7 | 3.1 | 2.5 |
| Lumi S/N (dB) | 3.4 | 3.2 | 3.3 | 0.5 | 3.0 | 2.4 |
| Chroma output (dB) | 2.2 | 2.1 | 1.8 | 2.2 | —0.3 | 1.7 |
| Chroma S/N | 2.2 | 1.9 | 2.1 | 2.1 | 0.6 | 1.6 |
| Coatability | G | G | G | G | G | G |
| Coating method | Simultaneously extruding wet-on-wet | Simultaneously extruding wet-on-wet | Simultaneously extruding wet-on-wet | Simultaneously extruding wet-on-wet | Simultaneously extruding wet-on-wet | Simultaneously extruding wet-on-wet |

| Magnetic layer | Comp.-15 | Comp.-16 | Comp.-17 | Comp.-18 |
|---|---|---|---|---|
| Uppermost layer | | | | |
| Dry thickness (μm) | 0.5 | 0.5 | 0.5 | 0.5 |
| Magnetic powder | Barium ferrite | Barium ferrite | Acicular Co-containing iron oxide | Barium ferrite |
| Anionic functional group of PVC resin | —SO$_3$K | —SO$_3$K | —SO$_3$K | —SO$_3$K |
| Anionic functional group of urethane resin | —SO$_3$Na | —SO$_3$Na | —SO$_3$Na | —SO$_3$Na |
| Middle layer | | | | |
| Dry thickness (μm) | 0.3 | 0.3 | 0.3 | 0.3 |
| Anionic functional group of PVC resin | —SO$_3$K | —SO$_3$K | —SO$_3$K | None |
| Anionic functional group of urethane resin | —SO$_3$Na | —COONa | —SO$_3$Na | None |
| Coercive force (Oe) | 450 | 1250 | 850 | 850 |
| Magnetic powder | Co-containing iron oxide | Co-containing iron oxide | Co-containing iron oxide | Co-containing iron oxide |
| Dry thickness (μm) | 2.5 | 2.5 | 2.5 | 2.5 |
| Lower layer | | | | |
| Anionic functional group of PVC resin | —SO$_3$K | —SO$_3$K | —SO$_3$K | —SO$_3$K |
| Anionic functional group of urethane resin | —SO$_3$Na | —COONa | —SO$_3$Na | —SO$_3$Na |
| Coercive force (Oe) | 450 | 1250 | 650 | 650 |
| Magnetic powder | Co-containing iron oxide | Co-containing iron oxide | Co-containing iron oxide | Co-containing iron oxide |
| RF output (dB) | 2.0 | 3.3 | 1.4 | — |
| Lumi S/N (dB) | 1.9 | 3.3 | 1.3 | — |
| Chroma output (dB) | 2.7 | 0.1 | 2.3 | — |
| Chroma S/N | 1.7 | 0.5 | 2.1 | — |
| Coatability | G | G | G | P |
| Coating method | Simultaneously extruding wet-on-wet | Simultaneously extruding wet-on-wet | Simultaneously extruding wet-on-wet | Simultaneously extruding wet-on-wet |

What is claimed is:

1. A magnetic recording medium comprising a support having an uppermost magnetic layer and at least one lower layer, said lower layer being between said support and said uppermost layer, said uppermost magnetic layer comprising a binder and a hexagonal magnetic powder and having a layer thickness of 0.1 to 1.0 μm, at least one said lower magnetic layer comprising a polyvinyl chloride resin having an anionic functional group, a polyurethane resin having either a sulfonic group or a carboxyl group, and a cobalt-containing ferromagnetic iron oxide powder, said at least one lower magnetic layer having a coercive force of 500 to 1200 Oe, said uppermost layer and said lower layer being formed on said support by wet-on-wet, substantially simultaneous multilayer coating.

2. A recording medium of claim 1, wherein said hexagonal magnetic powder has an average particle size of from 0.01 μm to 0.1 μm, and a tabular ratio of 3 to 5.

3. A recording medium of claim 1, wherein said hexagonal magnetic powder is composed of a hexagonal ferrite.

4. A recording medium of claim 3, wherein said hexagonal ferrite is a barium ferrite.

5. A recording medium of claim 1, wherein said uppermost layer has a layer thickness of from 0.1 μm to 0.7 μm.

6. A recording medium of claim 5, wherein said uppermost layer has a thickness of from 0.1 μm to 0.5 μm, 7. A recording medium of claim 1, wherein said binder contained in said lower layer has a weight average molecular weight of from 10,000 to 50,000.

8. A recording medium of claim 1, wherein said anionic functional group is a —SO$_3$M group, a —COOM group a PO(OM')$_2$ group, in which M is a hydrogen atom or an alkali metal atom and M' is a hydrogen atom, an alkali metal atom or a hydrocarbon residue.

9. A recording medium of claim 8, wherein said anionic functional group is contained in said binder of said lower layer in an amount of from 0.01 mmol/g to 1.0 mmol/g.

10. A recording medium of claim 9, said amount of said anionic functional group is 0.1 mmol/g to 0.5 mmol/g.

11. A recording medium of claim 1, wherein said lower layer has a coercive force of from 700 Oe to 1000 Oe.

12. A recording medium of claim 11, wherein said lower layer has a coercive force of from 800 Oe to 900 Oe.

13. A recording medium of claim 1, wherein said magnetic powder contained in said lower layer is a Co-containing ferromagnetic iron oxide.

14. A recording medium of claim 13, wherein said Co-containing iron oxide has an average major axis length of not more than 0.40 μm, and a crystal size of not more than 500 Å.

15. A recording medium of claim 14, wherein said Co-containing iron oxide has an average major axis length of from 0.12 μm to 0.25 μm, and a crystal size of from 250 Å to 400 Å.

16. A magnetic recording medium comprising a support, provided thereon, an uppermost magnetic layer and one or more lower magnetic layers being provided between said support and said uppermost magnetic layer, in which said uppermost magnetic layer comprises a binder and a hexagonal magnetic powder having an average particle size of from 0.01 μm to 0.1 μm and has a layer thickness of from 0.1 μm to 0.5 μm, and at least one of said lower magnetic layer comprises a polyvinyl chloride resin and a polyurethane resin each having a sulfonic group and a Co-containing iron oxide having an average major axis length of not more than 0.4 μm, and has a coercive force of from 500 Oe to 1200 Oe, and said uppermost magnetic layer and the lower layers are formed on said support by wet-on-wet simultaneous multi-layer coating.

* * * * *